Jan. 31, 1967  E. M. T. JONES ETAL  3,302,111
MULTIMODE WAVEGUIDE HARMONIC POWER SAMPLER
Filed June 13, 1966  2 Sheets-Sheet 1

INVENTORS
EDWARD M.T. JONES
AND EUGENE D. SHARP
BY Harry A. Herbert Jr.
Arsen Tashjian
ATTORNEYS

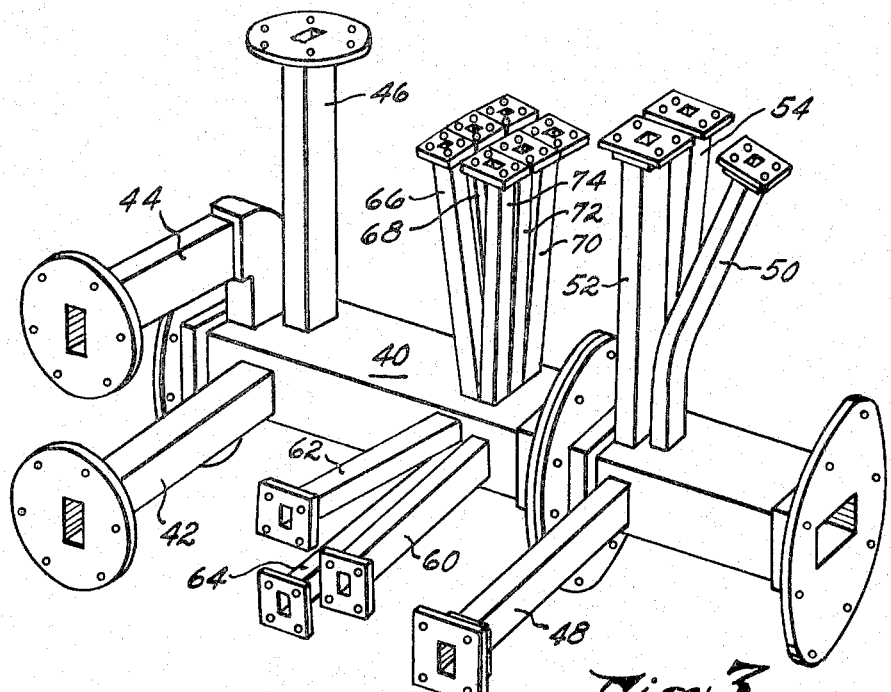
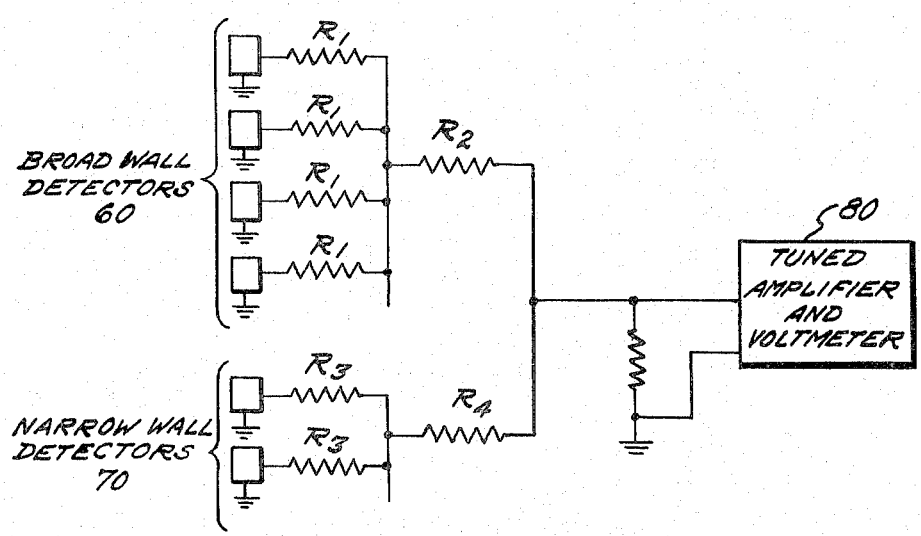

United States Patent Office 3,302,111
Patented Jan. 31, 1967

3,302,111
MULTIMODE WAVEGUIDE HARMONIC
POWER SAMPLER
Edward M. T. Jones, Portola Valley, and Eugene D. Sharp, Palo Alto, Calif., assignors to the United States of America as represented by the Secretary of the Air Force
Filed June 13, 1966, Ser. No. 557,864
2 Claims. (Cl. 324—95)

This is a continuation-in-part of application Serial No. 211,924, filed July 23, 1962 and now abandoned.

This invention relates to power measurement, and more particularly to a method and apparatus for the measurement of the harmonic frequency output of transmitters wherein the output is propagated in several modes in a waveguide.

Basically, the method and apparatus comprises a number of evenly spaced sampling irises around the periphery of a waveguide which serves as the output from a high powered transmitter. The irises are connected with sampling coaxial lines, or sampling waveguides which contain matched, calibrated, tuned detectors. The total multimode power at the frequency to which the detectors are tuned is obtained by averaging the power detected in the individual sampling waveguides.

Accordingly, it is an object of this invention to provide a method and apparatus for the measurement of the harmonic frequency output from high power transmitters which propagate in several modes in a waveguide.

It is another object of this invention to provide a compact apparatus for the measurement of total power propagated in a waveguide at particular frequencies.

It is still another object of this invention to provide a method and apparatus for the measurement of harmonic power in a multimode waveguide. The apparatus is simple to operate and economical to manufacture using conventional, currently available materials.

These and other advantages, features and objects of the invention will become more apparent from the following description taken in connection with the illustrative embodiments in the accompanying drawings, wherein:

FIG. 3 is a pictorial view of a multimode power sampler utilized for power measurement of a number of harmonic frequencies; and FIG. 4 is a diagrammatic representation of a typical adding cicuit which may be utilized with the structure of FIGS. 1 through 3 in order to determine the power measurements.

Figure 1:
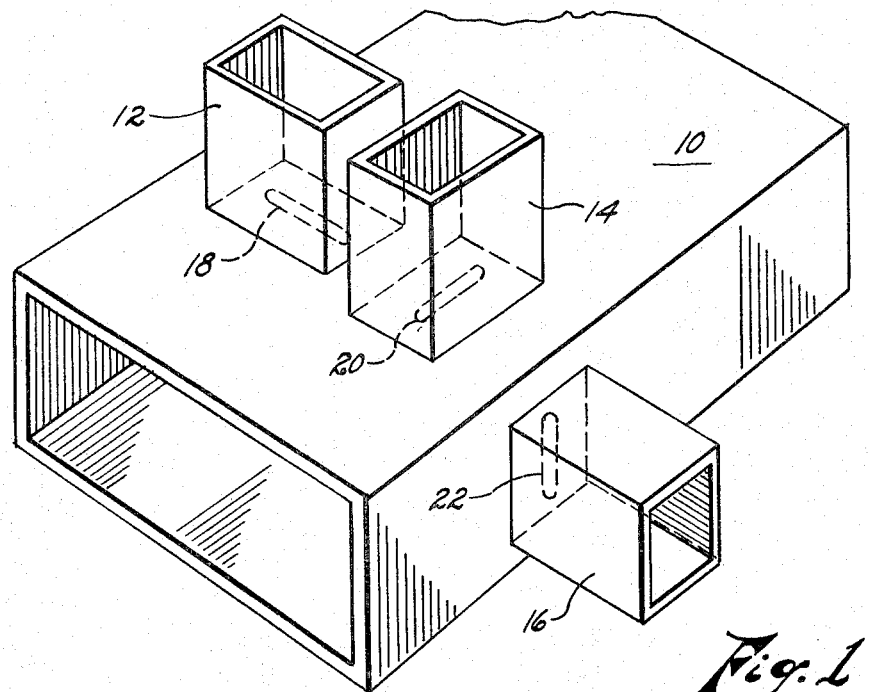
FIG. 1 is a pictorial representation of a rectangular waveguide having typical sampling irises and sampling waveguides mounted on the walls thereof.

Referring to FIG. 1, there is shown a waveguide 10 which is adapted to receive the output in a conventional manner from a high power transmitter (not shown). Attached to the rectangular waveguide 10 are a number of sampling waveguides 12, 14 and 16. Within the wall of the waveguide 10 are irises 18, 20 and 22 which are tuned to a particular resonant frequency and are relatively long and narrow in shape in order to sample the component of the H-field parallel to the long axis of the iris. Thus, irises 18 and 22 are arranged to sample the transverse H-field at the broad and narrow walls, respectively, of output waveguide 10. Iris 20 is oriented to sample the longitudinal H-field. The irises 18, 20 and 22 are tuned to a resonant frequency that is above the harmonic frequency being measured so that only a relatively small amount of H-field is sampled in order to perturb only slightly the H-fields in the waveguide 10.

Figure 2:
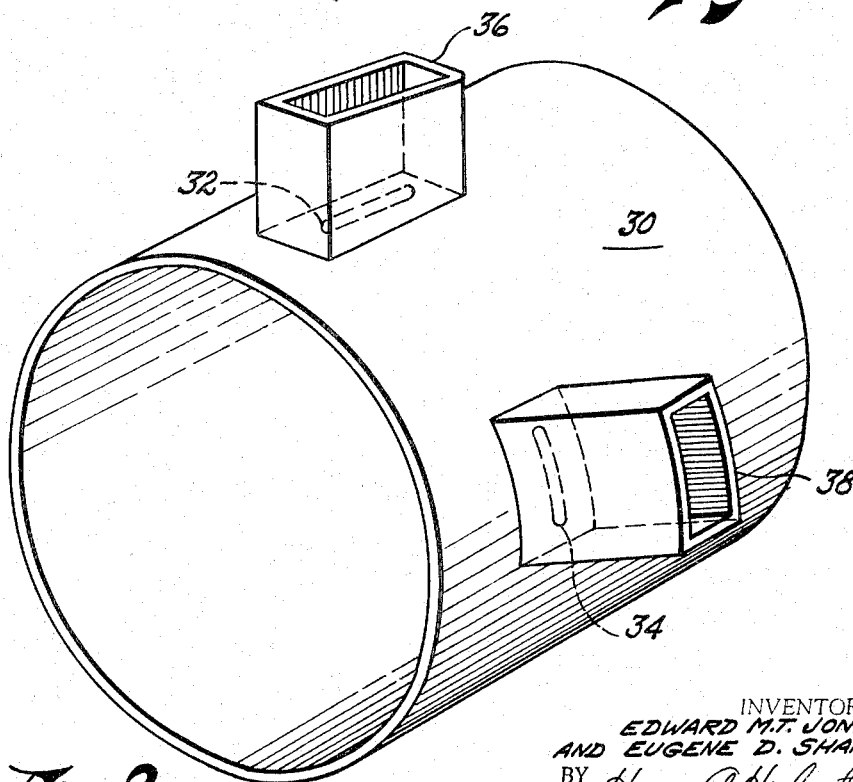
FIG. 2 is a pictorial representation of a circular waveguide having typical sampling irises and sampling waveguides mounted on its wall.

The output waveguide 30 of FIG. 2 is circular rather than rectangular, as illustrated in FIG. 1, and has irises 32 and 34 in the wall thereof which couple energy to sampling waveguides 36 and 38, respectively. The orientation of the iris 32 is such as to sample the longitudinal H-field, while the orientation of iris 34 samples the transverse H-field.

Although the discussion describing the invention has been related to rectangular and circular waveguides, it should be noted that identical irises could also be placed in coaxial transmission lines in order to accomplish the same purpose.

The embodiment of FIG. 3 represents a typical multimode power sampler which is capable of being utilized to measure the power propagated at a number of harmonic frequencies which are the output from a transmitter. In this embodiment, the ouput waveguide is designated by the numeral 40 and, as shown, is made up of at least two sections of waveguide structure coupled together. A series of sampling waveguides 42, 44, 46 and 48, 50, 52, 54, and 60, 62, 64, 66, 68, 70, 72, 74, and 76 are provided in the broad and narrow walls of waveguide 40 as shown. In this embodiment, irises which are tuned to a resonant frequency and sample only the transverse H-field are spaced evenly at points across the waveguide broad and narrow walls within the sampling waveguide structures. The number of irises required at each wall is equal to the number of field variations at the wall of the highest-order propagating mode.

The method for obtaining the total multimode power is to obtain the power sampled at each iris by means of suitable, conventional, commercial detectors. The averaged sampled power at the broad wall may be obtained by dividing the sum of all the broad wall sample powers by the number of broad wall irises, plus one. The average of the sampled powers at the narrow wall is obtained by dividing the sum of the narrow wall sample powers by the number of narrow walls irises, plus one. The resultant average of all the power would be the average of both the narrow and broad wall average sampled powers. From the resultant average and the calibration of the irises, the total multimode power may be determined.

In FIG. 4, a standard, conventional adding circuit is illustrated wherein detectors 60 for the broad wall have their outputs added through resistors $R_1$ and $R_2$ to be combined with the output from narrow wall detectors 70 through resistors $R_3$ and $R_4$ to be applied to a conventional tuned amplifier and voltmeter 80. Thus, continuous and instantaneous measurement of the power propagated at each harmonic frequency may be obtained.

The variation in sizes of the sampling waveguides as shown in the FIG. 3 reflect the fact that they are tuned to the various harmonics. The second harmonic is measured by utilizing waveguide samplers 42, 44, and 46, the third harmonic with waveguide samplers 48, 50, 52 and 54, and the fourth and fifth harmonics with waveguide samplers 60, 62, 64, 66, 68, 70, 72, 74 and 76. Although FIG. 3 shows waveguide samplers adapted to sample the transverse H-field, improvement of the accuracy of the measurement may be obtained by providing irises and sampling waveguides for the longitudinal H-field as well.

The previously outlined procedure may also be utilized with both cylindrical and coaxial waveguides to measure the total multimode power by cutting irises in the wall of the waveguide (see FIG. 2) at evenly spaced points around the circumference. The number of irises required would be at least one greater than double the number of full cycle angular field variations of the highest order propagating mode. The average sampled power in this application would be obtained by dividing the sum of the sampled powers by the number of irises. After the average sample power and the calibration of the irises is determined, the total multimode power can be computed from these values.

The typical multimode power sampling device shown in FIG. 3 comprises a series of irises in the wall of a 2.84 x 1.34 inch waveguide. Each iris is resonant to a particular frequency and is provided with a 0.622 x 0.311 inch sampling waveguide containing a tuned, matched calibrated detector. Measurements made in the laboratory at low power, in which the multimode waveguide was excited with various propagating modes of known total power, indicate that the device functions with utmost accuracy. A QK338 magnetron tube operating at a frequency of 2.8 kmc. and generating about 4.5 megawatts peak power was utilized to determine the accuracy of the device in the measurement of the second, third, fourth and fifth harmonic frequency powers.

The procedure used to measure the total multimode power in a rectangular waveguide is as follows: irises tuned to particular resonant frequencies are cut at evenly spaced points across the waveguide broad and narrow walls for sampling the transverse H-field. The number of irises required in each wall is equal to the number of field variations at the wall of the highest propagating mode. The power sampled at each iris is measured by suitable detectors. The sampled powers at the broad wall are then averaged by dividing the sum of the broad-wall sampled powers by one plus the number of broad-wall irises. Next, the sampled powers at the narrow-wall are averaged by dividing the sum of the narrow-wall sampled powers by one plus the number of narrow-wall irises. A resultant average is then obtained by averaging the narrow and broad-wall average sampled power. The total multimode power is determined from the resultant average and the calibration of the irises.

It should be understood that the above-described power measurement arrangements are merely illustrative of a few of the many specific embodiments which would include application of the principles of the invention. Also, those skilled in the art will understand that various changes an modifications, particularly with respect to the construction details, may be made without departing from the true spirit and scope of the invention as defined in the appended claims.

What we claim is:

1. A device for measuring harmonic power in a multimode waveguide, said device comprising a section of hollow electromagnetic wave transmission line, a plurality of transversely oriented, narrow irises disposed at evenly spaced points in the wall of said transmission line, said irises sampling only the component of H-field parallel to their long axes and being tuned to a resonant frequency above the harmonic frequency being measured so that only a relatively small amount of H-field is sampled, the number of said irises being equal to the number of field variations at the wall of the highest-order propagating mode, sampling waveguides attached to said transmission line at each end of said irises for receiving and transmitting the power emanating therefrom, and a calibrated, tuned detector having an output and being contained in each of said sampling waveguides for measuring the amount of power passing through said irises as an indication of the power in the multimode waveguide.

2. The device defined in claim 1, wherein an adding circuit is connected to the outputs of the detectors for averaging the sampled powers emanating from each of said irises and determining the total multimode power from these averages.

References Cited by the Examiner

UNITED STATES PATENTS

| | | | |
|---|---|---|---|
| 2,522,563 | 9/1950 | Blitz | 324—95 |
| 2,642,494 | 6/1953 | Zaslavsky | 250—39.2 X |
| 2,649,576 | 8/1953 | Lewis | 333—73 |
| 2,795,763 | 6/1957 | Tillotson | 333—73 |
| 2,991,417 | 7/1961 | Papp | 324—95 |
| 3,074,033 | 1/1963 | Smith | 333—10 |
| 3,142,061 | 7/1964 | Allen | 324—95 X |

WALTER L. CARLSON, *Primary Examiner.*

RUDOLPH V. ROLINEC, *Examiner.*